(12) United States Patent
Haimer

(10) Patent No.: US 8,439,369 B2
(45) Date of Patent: May 14, 2013

(54) TOOL HOLDER FOR A ROTARY TOOL

(75) Inventor: Franz Haimer, Igenhausen (DE)

(73) Assignee: Franz Haimer Maschinenbau KG

( * ) Notice: Subject to any disclaimer, the term of this patent is extended or adjusted under 35 U.S.C. 154(b) by 0 days.

(21) Appl. No.: 13/066,792

(22) Filed: Apr. 25, 2011

(65) Prior Publication Data

US 2011/0198818 A1     Aug. 18, 2011

Related U.S. Application Data

(62) Division of application No. 11/629,574, filed as application No. PCT/EP2005/006365 on Jun. 14, 2005, now Pat. No. 7,938,408.

(30) Foreign Application Priority Data

Jun. 14, 2004   (DE) .......................... 10 2004 028 682
Sep. 3, 2004    (DE) .......................... 10 2004 042 770

(51) Int. Cl.
    *B23B 31/117*       (2006.01)
(52) U.S. Cl.
    USPC ........... 279/102; 279/103; 279/9.1; 279/23.1; 29/447; 408/143; 409/141
(58) Field of Classification Search ................... 279/102, 279/103, 96, 23.1; 29/447; 403/273; *B23B 31/117; B25G 3/10*
    See application file for complete search history.

(56) References Cited

U.S. PATENT DOCUMENTS

| | | | | |
|---|---|---|---|---|
| 2,478,195 A | * | 8/1949 | Hull | 279/145 |
| 2,610,066 A | * | 9/1952 | Pigott | 279/51 |
| 2,695,787 A | * | 11/1954 | Sunnen | 279/46.5 |
| 3,807,804 A | * | 4/1974 | Kniff | 299/113 |
| 3,920,022 A | * | 11/1975 | Pastor | 606/41 |
| 3,999,418 A | * | 12/1976 | Morell | 72/377 |

(Continued)

FOREIGN PATENT DOCUMENTS

| | | | |
|---|---|---|---|
| FR | 2 489 189 | | 3/1982 |
| WO | WO 0119558 | * | 3/2001 |
| WO | WO-0189758 A1 | | 11/2001 |

OTHER PUBLICATIONS

International Search Report for PCT/EP2005/006365 dated May 19, 2006.

(Continued)

*Primary Examiner* — Eric A Gates
*Assistant Examiner* — Bryan Salone
(74) *Attorney, Agent, or Firm* — Edwards Wildman Palmer LLP; Scott D. Wofsy; Joshua L. Jones

(57) ABSTRACT

A shrink-fit chuck tool holder which comprises: clamping means which are provided centrally with respect to an axis of rotation of the tool holder for holding a shank of a rotary tool, and which define a receiving opening for the shank. The clamping means can be displaced in the radial direction between a release position for insertion or removal of the shank and a clamping position. The clamping means are assigned a clamping surface with a cylindrical contour which, in the clamping position, bears against the outer circumferential surface of the shank. The clamping surface has a helical groove surrounding the axis of rotation or a multiplicity of annular grooves surrounding the axis of rotation, which as seen in the direction of the axis of rotation project towards the axis of rotation and the roof surfaces of which form the clamping surface.

13 Claims, 4 Drawing Sheets

U.S. PATENT DOCUMENTS

| | | | | |
|---|---|---|---|---|
| 4,021,051 | A * | 5/1977 | Toyomoto et al. | 279/9.1 |
| 5,030,048 | A * | 7/1991 | Massa | 409/234 |
| 5,127,780 | A * | 7/1992 | Massa | 409/234 |
| 5,174,585 | A * | 12/1992 | Erkki | 279/2.08 |
| 5,301,961 | A * | 4/1994 | Wozar | 279/46.2 |
| 5,807,038 | A * | 9/1998 | Skinner | 408/204 |
| 5,957,636 | A * | 9/1999 | Boisvert | 409/131 |
| 6,260,858 | B1 * | 7/2001 | DeLucia | 279/102 |
| 6,315,506 | B1 * | 11/2001 | Mizoguchi | 409/234 |
| 6,371,705 | B1 * | 4/2002 | Gaudreau | 409/234 |
| 6,394,466 | B1 * | 5/2002 | Matsumoto et al. | 279/103 |
| 6,511,077 | B1 * | 1/2003 | Voss et al. | 279/102 |
| 6,595,528 | B2 * | 7/2003 | Voss | 279/102 |
| 6,726,223 | B2 * | 4/2004 | Haimer | 279/103 |
| 6,726,412 | B2 * | 4/2004 | Sugata et al. | 408/57 |
| 6,861,625 | B1 * | 3/2005 | Haimer et al. | 219/607 |
| 6,887,019 | B1 * | 5/2005 | Gerber | 409/234 |
| 6,923,451 | B2 * | 8/2005 | Taguchi et al. | 279/42 |
| 7,066,696 | B2 * | 6/2006 | Gerber | 409/234 |
| 7,115,846 | B2 * | 10/2006 | Haimer et al. | 219/635 |
| 7,137,185 | B2 * | 11/2006 | Voss et al. | 29/447 |
| 7,165,923 | B2 * | 1/2007 | Matsumoto et al. | 409/234 |
| 7,208,706 | B2 * | 4/2007 | Haimer et al. | 219/607 |
| 7,217,072 | B1 * | 5/2007 | Haimer | 409/234 |
| 7,284,938 | B1 * | 10/2007 | Miyazawa | 409/231 |
| 7,367,763 | B2 * | 5/2008 | Ruy Frota de Souza | 409/234 |
| 7,371,036 | B2 * | 5/2008 | Buttau et al. | 409/234 |
| 7,758,289 | B2 * | 7/2010 | Haimer et al. | 409/234 |
| 7,938,408 | B2 * | 5/2011 | Haimer | 279/102 |
| 7,959,387 | B2 * | 6/2011 | Frota De Souza et al. | 409/234 |
| 2002/0094250 | A1 * | 7/2002 | Voss | 409/234 |
| 2003/0132582 | A1 * | 7/2003 | Haimer | 279/102 |
| 2005/0135893 | A1 * | 6/2005 | Voss et al. | 409/234 |
| 2005/0188522 | A1 * | 9/2005 | Haimer et al. | 29/447 |
| 2005/0205554 | A1 * | 9/2005 | Haimer et al. | 219/607 |
| 2011/0198818 | A1 * | 8/2011 | Haimer | 279/103 |

OTHER PUBLICATIONS

Written Opinion for PCT/EP2005/006365 dated May 19, 2006.

* cited by examiner

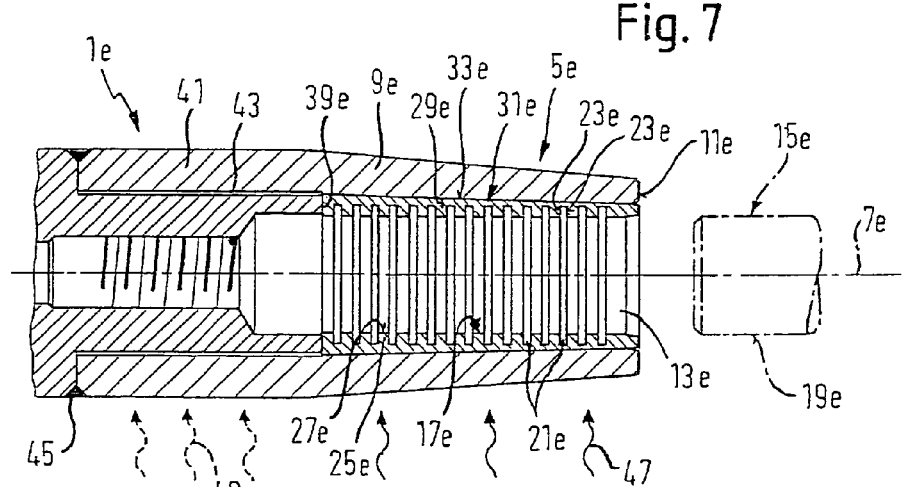
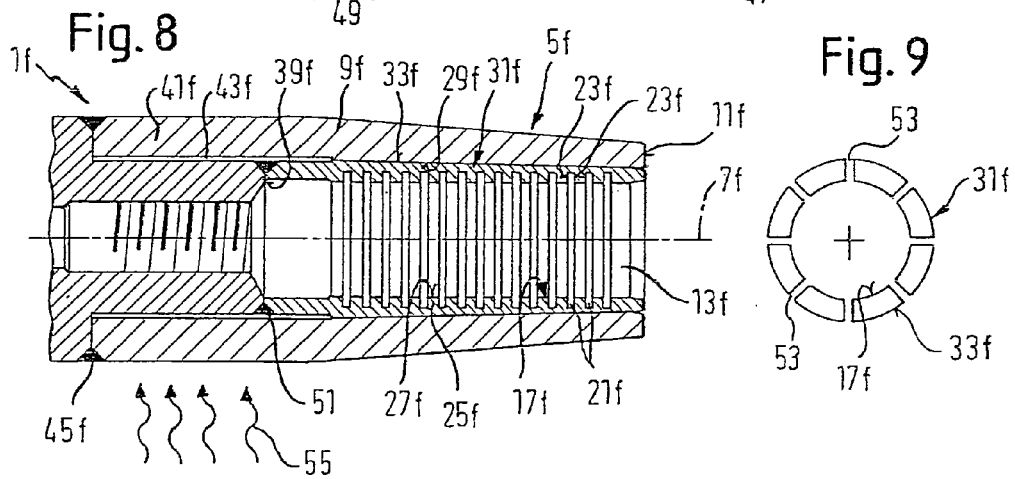
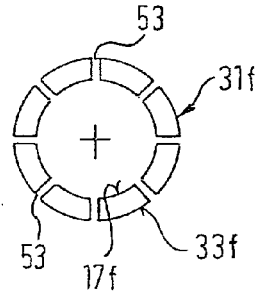
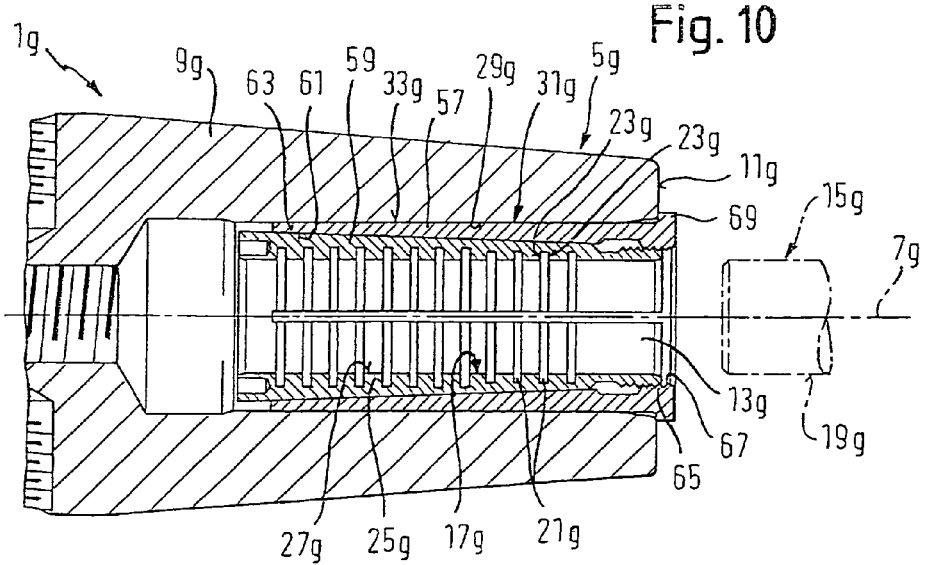

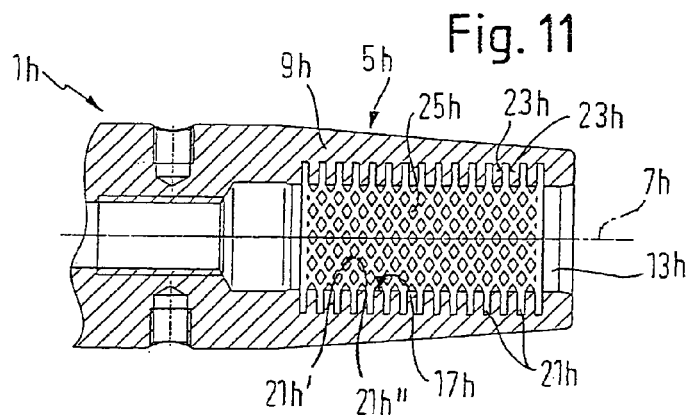
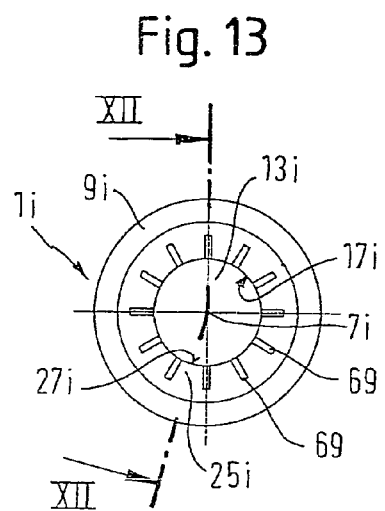
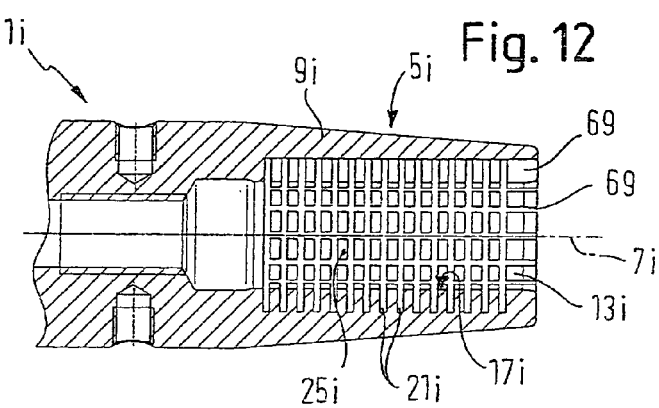
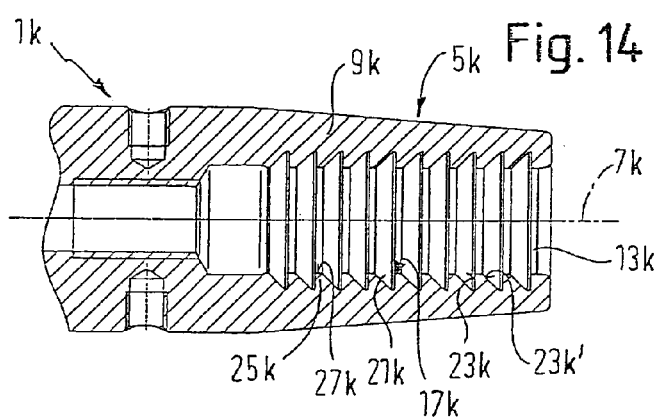
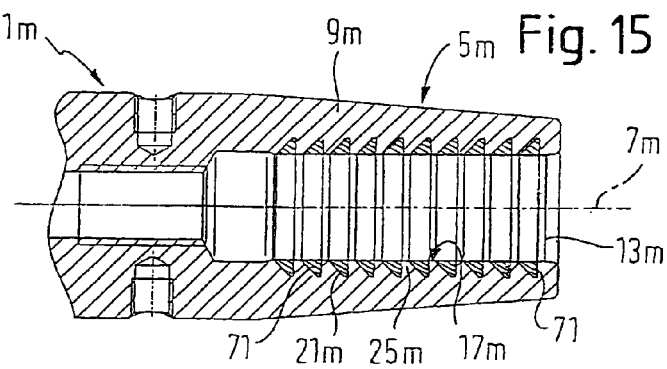

TOOL HOLDER FOR A ROTARY TOOL

CROSS-REFERENCE TO RELATED APPLICATIONS

This application is a divisional application of U.S. patent application Ser. No. 11/629,574, filed Dec. 14, 2006, which is a U.S. national phase application of international patent application number PCT/EP2005/006365, filed Jun. 14, 2005.

The invention relates to a tool holder for a rotary tool.

In practice, tool holders whereof clamping means which hold the shank of the rotary tool in a radial press fit have only a small maximum displacement are in widespread use for clamping rotary tools, such as for example drill bits or milling cutters or the like. In general, the smaller the clamping displacement, the greater the precision and running accuracy of the tool holder. For example, precision spring collet chucks have a clamping displacement of just a few millimeters, while other precision chucks, such as for example hydro-expansion chucks or mechanical chucks with continuous annular clamping means, but in particular tool holders of the shrink-fit chuck type, are designed in such a way that rotary tools with just a single nominal shank diameter can be clamped directly in the tool holder.

The tool holders explained above can be used to achieve sufficiently high press-fit forces. However, it has been found that the rotating cutting surfaces of the tools cause vibrations which leave behind chatter traces or the like in the cut-surface image of the machined workpiece. This limits the feed rate which can be achieved in the machine tool.

It has also been found that rotary tools which are sufficiently securely seated in the tool holder during vibration-free operation start to migrate in the axial direction in the event of vibrations occurring in the tool holder, and may become detached from the tool holder in operation.

With regard to a first aspect, it is an object of the invention to provide a tool holder which provides better protection against axial migration of the rotary tool during operation than has hitherto been the case. With regard to a second aspect, it is an object of the invention to provide better damping of vibrations excited by the rotary tool than has hitherto been the case.

The invention is based on a tool holder, the receiving section of which comprises clamping means which are provided centrally with respect to an axis of rotation of the tool holder for holding a shank of a rotary tool, and which define a receiving opening for the shank, it being possible for the clamping means to be displaced in the radial direction between a radially widened release position for insertion or removal of the shank and a clamping position, in which the clamping means exert radial press-fit forces, which hold the shank in a frictional lock on its cylindrical outer circumferential surface, on the shank, and the clamping means being assigned a clamping surface with a cylindrical contour which, in the clamping position, bears against the outer circumferential surface of the shank with surface-to-surface contact. As was explained in the introduction, tool holders of this type are known as precision tool holders, for example of the shrink-fit chuck type.

The improvement according to the invention consists in the fact that the region of the tool holder which forms the clamping surface has a multiplicity of groove sections which are curved about the axis of rotation, are arranged at an axial distance from one another and—as seen in the direction of the axis of rotation—delimit between themselves supporting regions, which are integrally connected to one another, are arranged at an axial distance from one another, project towards the axis of rotation and the roof surfaces of which, located towards the axis of rotation, form the cylindrical clamping surface.

The roof surfaces of the supporting regions follow a cylindrical contour and their overall dimensions are such that the torque required for operation can be transmitted by the press-fit forces of the clamping means. However, since the supporting regions, on account of the groove sections, protrude freely in the axial direction, the supporting regions are to a certain extent axially elastic compared to conventional regions of tool holders forming the supporting surface, and can compensate for and damp bending vibrations on the part of the receiving section of the tool holder relative to the shank of the rotary tool. The tendency of the tool shank to migrate out of the receiving opening is considerably reduced.

Expediently, the groove sections are formed by at least one helical groove which is curved about the axis of rotation or by a multiplicity of annular grooves which are arranged at an axial distance from one another and surround the axis of rotation. If the annular grooves are used, a rotationally symmetrical supporting region structure is produced, which is distinguished by particularly high axial retaining forces. The production of the supporting region structure with the aid of one or more axially offset annular helices can be realized particularly simply by employing a thread-cutting operation. If two oppositely directed helical grooves are cut, a rotationally symmetrical supporting region structure is achieved in this case too.

The helical grooves or annular grooves explained above produce web-like supporting regions which surround the axis of rotation helically or annularly. In a variant, however, it is also possible to provide that the region of the tool holder which forms the clamping surface has a multiplicity of supporting regions, which are arranged at a distance from one another on all sides, in the form of protuberances which are separated from one another on all sides by the groove sections but are integrally connected to one another and the roof surfaces of which, projecting towards the axis of rotation, in turn form the cylindrical clamping surface. Compared to the embodiment explained above, the protuberances can better influence the radial or axial elasticity properties of the region of the tool holder which forms the clamping surface.

Protuberances of the type explained above are relatively simple to produce if the supporting regions along the clamping surface are delimited by at least two groups of groove sections, the groove sections of each group running next to and at a distance from one another within the clamping surface, without crossing one another, and the groove sections of different groups crossing one another within the clamping surface so as to form the supporting regions. By way of example, the groove sections belonging to a first group may be formed by at least one helical groove curved about the axis of rotation, and the groove sections belonging to a second group may be formed by at least one helical groove which is curved about the axis of rotation in the opposite direction to the at least one helical groove belonging to the first group or with a different pitch from the at least one helical groove belonging to the first group and/or by a multiplicity of annular grooves which surround the axis of rotation and are arranged at an axial distance from one another and/or by a multiplicity of grooves which are distributed in the circumferential direction of the clamping surface and extend in the axial direction. Helical grooves, annular grooves or axial grooves are relatively easy to produce with the aid of machine tools. In a variant, however, it is also possible to provide that the groove sections belonging to a first group are formed by a multiplicity of annular grooves which surround the axis of rotation and are arranged at an axial distance from one another, and the groove sections belonging to a second group are formed by at least one helical groove which is curved about the axis of rotation and/or by a multiplicity of grooves which are distributed in the circumferential direction of the clamping surface and extend in the axial direction.

Expediently, the roof surfaces of the supporting regions—as seen in axial longitudinal section through the receiving section—together with groove side faces which laterally adjoin the roof surface in the axial direction, follow a rectangular contour or a parallelogram contour or a trapezium contour. Expediently, at least one of the groove side faces of a multiplicity of adjacent supporting regions, in particular both groove side faces, run at right angles to the axis of rotation; however, it is also possible for one or both groove side faces to be conical in form. The damping properties of the supporting region structure can be altered by suitable selection of the angle of inclination.

If the two conical groove side faces narrow in the same direction as seen in the direction of the axis of rotation, supporting regions which are inclined relative to the axis of rotation are formed; these supporting regions, if the groove side faces narrow in the direction away from the rotary tool, boost the press-fit forces exerted on the tool shank for the outward movement of the shank. Expediently, two groups provided each have a multiplicity of axially adjacent supporting regions whereof the conical groove side faces narrow in the same direction, whereas the conical groove side faces of the two groups narrow in opposite directions. This is particularly good at preventing axial migration of the tool shank in the event of bending vibrations on the part of the tool holder, in particular if the conical groove side faces of the two groups narrow towards one another.

The width of the at least one helical groove or the width of each annular groove, based on the width of the roof surface between adjacent turns of the helical groove or between adjacent annular grooves, influences the damping properties and the inertia of the tool shank clamped in the tool holder. It is preferable for the width of the helical groove or the annular groove to be narrower than the width of the roof surface of the supporting region remaining in between. The narrower the groove width, the larger the clamping surface area which remains for the transmission of the press-fit forces. The width of the roof surface, by contrast, together with angle of inclination of the groove side faces, influences the vibration-damping properties of the supporting regions. It has also emerged that the radial depth of the at least one helical groove or the depth of each annular groove is expediently greater than the width of the helical groove or the width of the annular groove, in order to ensure an axial elasticity of the supporting regions which is sufficient for the damping properties.

The groove sections which are formed, for example, by helical grooves, annular grooves or axial grooves may be open towards the receiving opening. In a preferred configuration, however, the groove sections, at least over part of their, longitudinal extent, but in particular over substantially their entire length, may be filled with a material which is different from the material of the region of the tool holder which forms the clamping surface. The filling can be used for various purposes. By way of example, the filling can be used to achieve a liquid-tight seal, in particular in the case of helical grooves or axial grooves. However, the filling can also be used to improve the vibration damping or, for example in the case of a tool holder of the shrink-fit chuck type, can provide thermal insulation for the tool shank during the shrink-fit operation. The filling material may consist of plastic or ceramic or metal.

The groove sections, which are formed, for example, as helical grooves or annular grooves, can be formed directly into the material of the receiving section of the tool holder. In the case of a tool holder of the shrink-fit chuck type, they can be formed directly into the thermally expandable sleeve section forming the receiving opening for the receiving shank. However, it has also proven expedient for the supporting region or element structure to be formed into a possibly separate, radially elastic bush, which for its part is inserted into the receiving opening in the tool holder and transmits the radial press-fit forces of the clamping means of the tool holder to the tool shank. A bush of this type can be used as a diameter compensation bush, by means of which a tool holder which is intended to clamp just a single nominal shank diameter can also be used for other (admittedly smaller) shank diameters. In particular in the case of a tool holder of the shrink-fit chuck type, however, a bush of this type also facilitates the maximum clamping displacement which can be achieved. In a configuration of this type, it is expediently provided that the groove sections, which are designed, for example, as helical groves or as annular grooves, are provided in an inner circumferential surface, which forms the cylindrically contoured clamping surface, of a radially elastic bush which receives the shank of the rotary tool, and that the clamping means have a further clamping surface which defines the receiving opening and which can be adjusted in the radial direction between the release position and the clamping position, it being possible, in the release position of the clamping means, both for the bush to be inserted into or removed from the receiving opening and/or for the shank to be inserted into or removed from the bush, and the bush, in the clamping position, transmitting the radial press-fit forces of the clamping means to the shank. The bush may be a separate component which can be removed from the tool holder; as will be explained in more detail below, however, the bush may also be fixedly connected to the tool holder or formed integrally on it.

Preferably, the bush has at least one axially extending compensation joint, but preferably a plurality of these compensation joints distributed in the circumferential direction, in order to produce sufficient elastic properties in the radial direction and to ensure that the press-fit forces exerted by the clamping means are weakened to the minimum possible extent. The compensation joints may be axially extending grooves or axial slots which penetrate through the bush in the radial direction. In particular, grooves may be provided both on the inner circumferential surface and on the outer circumferential surface, in order to achieve particularly good radial elasticity properties by means of the meandering cross-sectional structure formed in this way.

The clamping displacement of precision tool holders, in particular of tool holders of the shrink-fit chuck type, normally requires shank diameters which are kept within tight tolerance limits. To enable optimum use to be made of the clamping displacement even when diameter compensation bushes are employed, in a preferred configuration it is provided that the bush comprises two sleeves which are arranged coaxially one inside the other, of which the outer sleeve has a conical inner surface and the inner sleeve has a conical outer surface, bearing against the conical inner surface of the outer sleeve, and a cylindrically contoured inner surface, which forms the clamping surface of the bush and the internal diameter of which can be changed by axial displacement of the inner sleeve and the outer sleeve relative to one another until the clamping surface comes to bear against the shank. A bush of this type makes it possible to bridge differences in diameter between the external diameter of the tool shank and the nominal internal diameter of the tool holder, including compensation for tolerances in the diameter of the tool shank. For this purpose, the two-part bush is first of all pushed onto the tool shank and fixed in a defined clamping fit on the tool shank by adjustment of the inner sleeve relative to the outer sleeve. However, the clamping forces do not yet have to be of the level required for transmission of the operating torque, since the press-fit forces required for this purpose are subsequently exerted on the tool shank by the clamping means of the tool holder via the bush. In the case of the two-part bush too, compensation joints in the form of axially extending grooves or slots may be provided at least on the inner sleeve, but preferably also on the outer sleeve, in order to improve the radial elasticity properties.

The outer circumferential surface of the bush may have a cylindrical contour. However, to allow the bush to be placed in an axially defined position in the tool holder, which is important in particular in the case of tool holders which are also subjected to thermal expansion in the axial direction, i.e. tool holders of the shrink-fit chuck type, according to a preferred configuration it is possible to provide that the abovementioned further clamping surface of the clamping means is designed as a conical inner surface, and the bush has a conical outer surface, which bears against the conical inner surface and, in a corresponding way to the conical inner surface, narrows towards the rotary tool in the direction of the axis of rotation. The bush is axially supported against the tool holder on that side of the region of its clamping surface which is axially remote from the rotary tool. During the transition from the release position to the clamping position, the clamping means automatically pull the bush axially onto the supporting surfaces, which are formed, for example, as axial stop shoulders, of the tool holder.

In the case of a tool holder of the shrink-fit chuck type, to form the clamping means this tool holder may have a sleeve section, which by heating can be transferred to the release position and by cooling can be transferred to the clamping position, forms the conical inner surface of the further clamping surface, surrounds the conical outer surface of the bush and is fixedly connected to the tool holder on that side of the clamping surface formed by the inner circumferential surface of the bush which is axially remote from the rotary tool. A sleeve section of this type not only generates radial press-fit forces, but also, during cooling, generates axial forces which on the one hand apply a radial load to the bush in the style of a collet chuck and on the other hand press the bush axially onto its supporting surface. A tool holder of this type can be used to achieve high press-fit forces with accurate positioning.

Configurations in which the sleeve section, on the side axially remote from the rotary tool, has an extension, which extends axially beyond the region forming the further clamping surface, surrounds the tool holder and/or the bush at a radial distance and the end region of which is fixedly connected to the tool holder, are particularly important. During the transition from the release position to the clamping position, the axially shrinking sleeve section is shortened and generates permanent axial clamping forces which act on the bush and damp vibrations generated in operation, in particular bending vibrations. The damping action is based not least on the combined frictionally locking and positively locking clamping of the sleeve section at the conical outer circumference of the bush.

Furthermore, a refinement in which the sleeve section consists of a material whereof the coefficient of thermal expansion is greater than the coefficient of thermal expansion of the bush and/or of that region of the tool holder which is surrounded by the sleeve section is particularly advantageous. The higher thermal expansion capacity of the sleeve section firstly increases the clamping displacement of the tool holder and secondly increases the axial clamping forces in the clamping position which are desired for vibration damping.

To transfer the tool holder into the release position, the sleeve section can be heated only in the region of the bush; however, it can also be heated over its entire length, in order to increase the opening displacement. It has proven advantageous if the bush is fixedly connected to the tool holder at its end remote from the rotary tool and the sleeve section is heated substantially exclusively in the region of its extension in order to be transferred into the release position. Conventional tool holders of the shrink-fit chuck type are usually heated, for example inductively, in the region of the clamping surfaces which clamp the tool shank. To achieve this, it is necessary to ensure that only the sleeve section but not the tool shank is heated, since otherwise it would be more difficult to remove the tool from the chuck. On the other hand, if the sleeve section is heated only in the region of the extension and therefore axially outside the clamping surfaces holding the tool shank, these jamming effects making it more difficult to remove the tool from the chuck do not occur.

Tool holders of the shrink-fit chuck type as explained above, in which the tool shank is clamped by press-fit forces from a sleeve section of the tool holder via a bush or bush section with conical outer surface also have independent inventive importance irrespective of whether the cylindrical clamping surface, beating against the took shank, of the bush or bush section is divided into supporting elements or supporting regions by a helical groove or by annular grooves. What is important is primarily that the sleeve section surrounds a radially elastic bush section, which is central with respect to the axis of rotation, is axially supported against the tool holder, forms the receiving opening for the shank of the rotary tool and the inner circumferential surface of which forms a clamping surface for transmitting the press-fit forces of the sleeve section to the shank, and that the sleeve section has a conical inner surface and the bush section has a conical outer surface, these surfaces narrowing towards the rotary tool in the direction of the axis of rotation, with the conical inner surface, in the clamping position, bearing against the conical outer surface. In this case, the sleeve section, on the side which is axially remote from the rotary tool, has an extension, which extends axially beyond the region of the clamping surface of the bush section, surrounds the tool holder and/or the bush section at a radial distance and the end region of which is fixedly connected to the tool holder. As an alternative or indeed in addition, it is possible to provide that the sleeve section consists of a material whereof the coefficient of thermal expansion is greater than the coefficient of thermal expansion of the bush section and/or of that region of the tool holder which is surrounded by the sleeve section. In this tool holder too, as explained above, it is preferable for only the region of the extension of the sleeve section to be heated in order to release the tool holder.

The following text provides a more detailed explanation of exemplary embodiments of the invention with reference to drawings, in which:

FIG. 7 shows an axial longitudinal section through a variant of the tool holder shown in FIG. 6;

FIG. 8 shows an axial longitudinal section through a variant of the tool holder shown in FIG. 7;

FIG. 9 shows an axial view of the bush contained in the tool holder shown in FIG. 8;

FIG. 10 shows an axial longitudinal section through a tool holder of the shrink-fit chuck type with a diameter compensation bush;

FIG. 11 shows an axial longitudinal section through a tool holder with a third variant of the supporting element structure;

FIG. 12 shows an axial longitudinal section through a tool holder with a variant of the supporting element structure shown in FIG. 11, seen on line XII-XII in FIG. 13;

FIG. 13 shows an axial view of the tool holder shown in FIG. 12;

FIG. 14 shows an axial longitudinal section through a tool holder with a fourth variant of the supporting element structure, and FIG. 15 shows an axial longitudinal section through a tool holder with a variant of the supporting element structure shown in FIG. 14.

Figure 1:
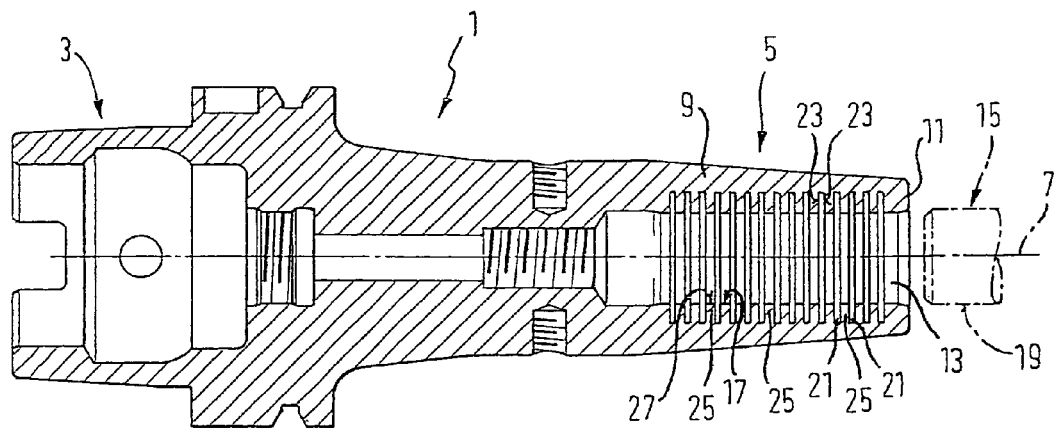
FIG. 1 shows an axial longitudinal section through a tool holder of the shrink-fit chuck type with a supporting element structure according to the invention.

FIG. 1 shows a tool holder 1 of the shrink-fit chuck type with a coupling section 3, in this case in the form of a hollow-shank taper for the rotationally fixed coupling to a work spindle of a machine tool, at its one axial end, and a receiving section 5 at its other axial end. The axis of rotation of the tool holder 1 is shown at 7. The coupling section 3 may be of any desired form, that is to say it may be in the shape of a steep-angle taper or the like. The receiving section 5 has the basic shape of a sleeve 9 which ends in an end face 11 running perpendicular to the axis of rotation 7 and contains a cylindrical receiving opening 13 which is central with respect to the axis of rotation 7 and in which a rotary tool (not shown in more detail), for example a milling cutter or a drill bit, exchangably engages by way of its cylindrical tool shank 15, in a manner which is explained in more detail below. For sake of clarity, FIG. 1 shows the tool shank 15 before it is inserted into the receiving opening 13, in which it is held in a frictionally locking manner in a press fit by the radial inner circumferential surface, forming a clamping surface 17, of the sleeve 9.

The external diameter of the outer circumferential surface 19 of the tool shank 15 is slightly larger than the internal diameter of the clamping surface 17. When the receiving section 5 is heated, for example by means of an inductive shrink-fit apparatus of the type described in WO 01/89758A1, the receiving opening 13 expands sufficiently for it to be possible for the tool shank 15 to be fitted into the thermally expanded receiving opening 13. After cooling, the sleeve 9 of the receiving section 5 exerts radial compressive forces on the tool shank 15 and fixes the latter in the receiving section 5. To enable the tool shank 15 to be removed again from the tool holder 1, the receiving section 5 is heated again until it releases the tool shank 15.

Vibrations, in particular bending vibrations, may occur when the rotary tool clamped into the tool holder 1 is operating. To prevent the tool shank 15 from axially migrating out of the receiving opening 13 as a result of the vibrations, the sleeve 9 includes, in the region of the clamping surface 17, a multiplicity of groove sections in the form of annular grooves 21, which are formed into the clamping surface 17 of the sleeve 9 next to and at an axial distance from one another. The annular grooves 21 have side faces 23 which are parallel to one another and are normal with respect to the axis and which, between adjacent annular grooves 21, delimit supporting elements 25 in the form of annular ribs. The supporting elements 25 have roof surfaces 27, a large number of which in combination form the clamping surface 17.

Since axially adjacent supporting elements 25 are each separated from one another by one of the annular grooves 21, they are to a certain extent axially elastic and can compensate for axial expansion differences between the tool shank 15 and the sleeve 9. The vibration properties and therefore the damping properties of the receiving region 5 of the tool holder 1 can be influenced by suitable selection of the radial depth of the annular grooves 21, with respect to the axial width of the supporting elements 25, on the one hand, and the axial width of the annular grooves 21, based on the axial width of the supporting elements 25, on the other hand. It is expedient for the radial depth of the annular grooves 21 to be greater than the axial width of the roof surfaces 27 and preferably also greater than the axial width of the annular grooves 21, in order on the one hand not to excessively weaken the clamping surface 17 and on the other hand to ensure sufficient axial elasticity of the supporting elements 25. It is also preferable for the width of the annular grooves 21 to be narrower than the width of the roof surface 27 between adjacent annular grooves 21, in order to ensure a sufficiently large clamping surface 17.

In the exemplary embodiment shown in FIG. 1, the clamping surface 17 is defined by a multiplicity of annular roof surfaces 27 arranged next to one another in the axial direction. It will be understood that as an alternative to a multiplicity of axially adjacent annular grooves 21, it is also possible to provide a single helical groove or if appropriate a plurality of axially offset helical grooves which are provided in helical form in the clamping surface 17. A helical groove of this type, which is not illustrated in more detail, produces supporting-element turns which correspond to the annular supporting elements 21 explained above.

The following text explains variants of the tool holder shown in FIG. 1. Components which have an equivalent effect are denoted by the reference numerals used in exemplary embodiments explained previously with the addition of a letter in order to distinguish them. For an explanation of the structure and effect and of any variants, reference is made to the description as a whole.

In the exemplary embodiment shown in FIG. 1, the two groove side faces 23 of the annular grooves 21 run at right angles to the axis of rotation 7, and accordingly the supporting elements 25, when the receiving section 5 is seen in axial longitudinal section, have a rectangular contour. In a variant, the groove side faces may also be inclined at an acute angle other than 90° with respect to the axis of rotation 7, so that they are substantially conical in form. The roof surfaces of the supporting regions—as seen in axial longitudinal section through the receiving section 5—may also follow a parallelogram contour or a trapezium contour, depending on the direction in which the conical groove side faces of each annular groove or each helical groove narrow in pairs relative to one another.

Figure 2:
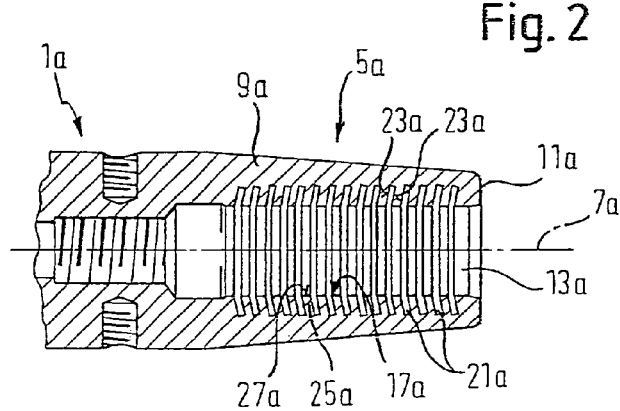
FIG. 2 shows an axial longitudinal section through the tool holder with a first variant of the supporting element structure.

FIG. 2 shows a tool holder 1a, the receiving section 5a of which is formed by a sleeve 9a, which forms the receiving opening 13a for the tool shank (not shown in more detail). The inner circumferential surface, which once again serves as the clamping surface 17a, of the receiving opening 13a of the sleeve 9a includes a multiplicity of annular grooves 21a which are arranged next to one another in the axial direction and the groove side faces 23a of which run with a conical profile and, as seen in the direction of the axis of rotation 7a, narrow at the same cone angle and in the same direction away from the insertion side, delimited by the end face 11a, of the tool shank. The supporting elements 25a which remain between adjacent annular grooves 21a are therefore generally in the shape of a parallelogram and are positioned obliquely opposite to the direction in which the tool shank is pulled out. If a load is applied to the tool shank in the direction in which it is pulled out, the supporting elements 25a are straightened, which increases the radial contact pressure exerted on the tool shank.

Figure 3:
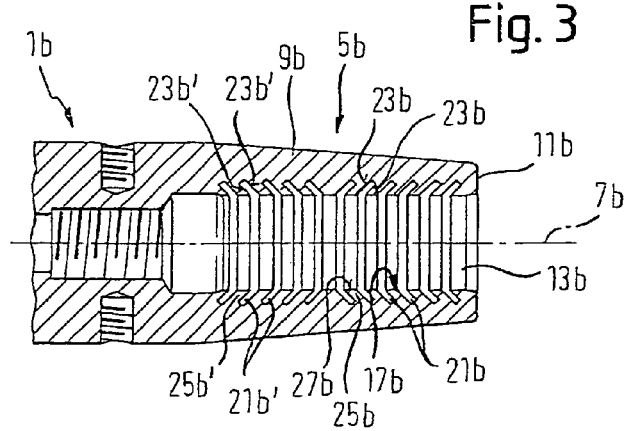
FIG. 3 shows an axial longitudinal section through a tool holder with a second variant of the supporting element structure.

FIG. 3 shows a tool holder 1b, which differs from the tool holder shown in FIG. 2 substantially only by virtue of the fact that the supporting surface 17b of the sleeve 9b includes two groups of annular grooves 21b and 21b', each with respective conical groove side faces 23b and 23b', pairs of which between them in each case form obliquely positioned supporting elements 25b and 25b', respectively. The groove side faces 23b and 23b' within each group narrow in the same direction and with the same cone angle, but the groove side faces of the two groups respectively narrow in opposite directions. The supporting elements 25b and 25b' of the two groups formed by the annular grooves 21b and 21b' are accordingly positioned obliquely in opposite directions. In the exemplary embodiment illustrated, the annular grooves 21b and 21b' of the two groups narrow towards one another. The two groups contain approximately the same number of supporting elements.

Figure 4:
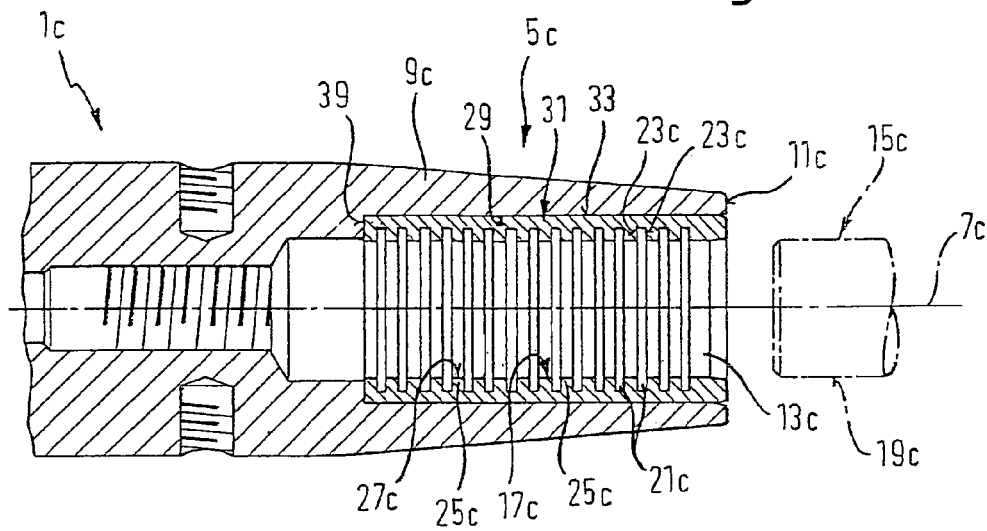
FIG. 4 shows an axial longitudinal section through the tool holder with a bush forming the supporting element structure.

In the variants of the tool holder explained above, the supporting element structure is formed directly into the material of the sleeve which is formed integrally on the tool holder so as to produce the receiving section 5. FIG. 4 shows a variant of a tool holder 1c of the shrink-fit chuck type whereof the sleeve 9c forming the receiving section 5c forms a cylindrical receiving opening 29, centrally with respect to the axis of rotation 7c, for a bush 31. The bush 31 has a cylindrical outer circumferential surface 33, and its likewise cylindrical inner circumferential surface forms the clamping surface 17c of the tool holder for the press-fit receiving of the tool shank 15c.

Figure 5:
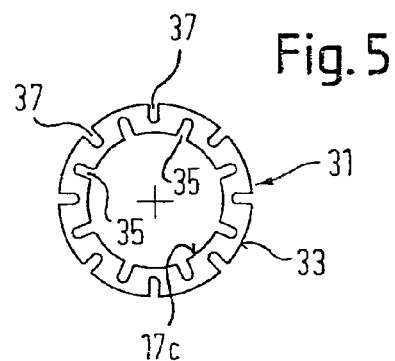
FIG. 5 shows an axial view of the bush of the tool holder shown in FIG. 4.

As shown in FIG. 5, the clamping surface 17c of the bush 31 includes a multiplicity of circumferentially distributed, axially extending grooves 35. Further axially running grooves 37 are arranged in the outer circumferential surface 33 of the bush 31, in each case centrally between a pair of the grooves 35. Therefore, when seen in axial cross section, the bush 31 has an approximately meandering wall structure and therefore radially elastic properties. It will be understood that the slots 35 and 37 may if appropriate also be designed as slots which penetrate through the bush 31 in the radial direction.

Unlike in the embodiments shown in FIGS. 1 to 3, the annular grooves 21c and the annular supporting elements 25c formed between the annular grooves 21c are formed in the supporting surface 17c formed by the bush 31. In the exemplary embodiment illustrated, the annular grooves 21c have groove side faces 23c running normally with respect to the axis. The groove side faces 23c may, however, also be modified in accordance with the variants explained with reference to FIGS. 1 to 3 or those explained below with reference to FIGS. 11 to 15.

By heating of the sleeve 9c, the tool holder 1c is expanded into its release position, in which the radially elastic sleeve 31 widens in the radial direction to a sufficient extent for it to be possible for the tool shank 15c to be fitted into or removed from the receiving opening 13c. After cooling, the sleeve 9c clamps the tool shank 15c in a press fit, with the bush 31, which by way of its clamping surface 17c bears against the cylindrical, outer circumferential surface 19c of the tool shank 15c with surface-to-surface contact, transmitting the press-fit forces from the sleeve 9c to the tool shank 15c.

The sleeve 31 is positioned removably in the sleeve 9c, so that after the bush 31 has been exchanged the tool holder 1c can be adapted to tool shanks with different diameters. It is expedient for the inner circumferential surface 29 of the sleeve 9c, on the side axially remote from the end face 11c, to be delimited by an annular shoulder 39, against which the inner end of the bush 31 is axially supported and positioned.

Figure 6:
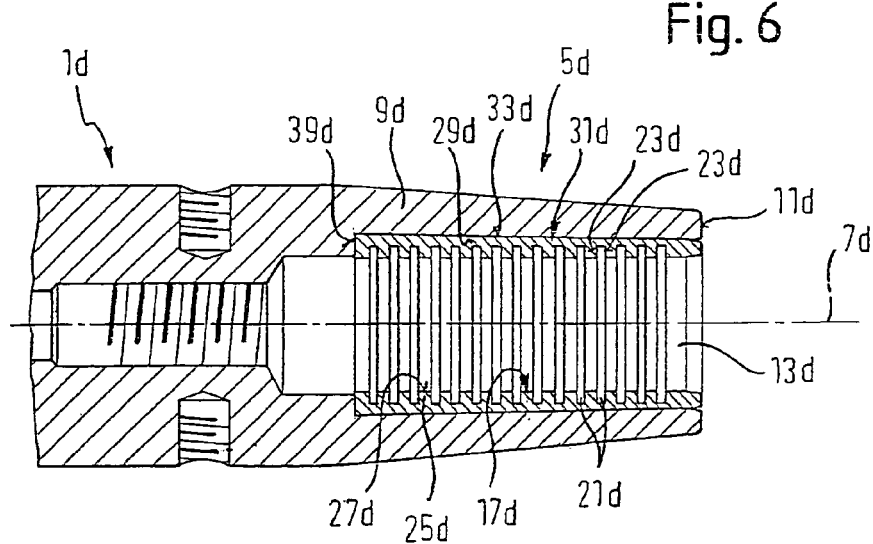
FIG. 6 shows an axial longitudinal section through the tool holder with a variant of the bush containing the supporting element structure.

FIG. 6 shows a tool holder 1d which differs from the tool holder 1c substantially only by virtue of the fact that the outer circumferential surface 33d of the bush 31d, and also the inner circumferential surface 29d, bearing against the outer circumferential surface 31d, of the sleeve 9d are conical in form and narrow towards the tool-side end face 11d of the sleeve 9d. The radially elastic bush 31d, during clamping of the tool holder 1d, is then automatically pulled onto the stop shoulder 39d, where it is positioned in the axial direction.

FIG. 7 shows a tool holder 1e which differs from the tool holder shown in FIG. 6 substantially by virtue of the fact that the sleeve 9e, which by way of its conical inner circumferential surface 29e bears against the likewise conical outer circumferential surface 33e of the bush 31e and generates the press-fit forces in the clamping position, has, on its side which is axially remote from the end face lie and therefore from the rotary tool, an extension 41, which is likewise in the form of a sleeve and surrounds that region of the tool holder 1e which forms the stop shoulder 39e on the side which is axially remote from the bush 31e, so as to form an annular gap 43 with a radial spacing. At its end which is axially remote from the end face lie, the extension 41 is fixedly connected to the tool holder 1e. The bush 31e may be fitted removably into the sleeve 9e; however, it may also be fixedly connected to the tool holder 1e in the region of the shoulder 39e, for example by being welded to it or formed integrally on the tool holder 1e. The sleeve 9e is expediently produced as a separate component and is subsequently fixedly connected to the tool holder 1e, for example welded to it, at that end of the extension 41 which is axially remote from the rotary tool, as indicated at 45.

The tool holder 1e is of the shrink-fit chuck type. To release the tool holder 1e, the sleeve 9e, at least in the region of its conical inner circumferential surface 29e surrounding the sleeve 31e, is heated, for example inductively, as indicated by arrows 47. The heating may also extend into the region of the extension 41 (arrows 49), which has the advantage that the sleeve 9e which clamps the tool shank 15e via the bush 31e is expanded not just radially but also to an increased extent in the axial direction, which increases the opening displacement of the tool holder 1e.

During cooling, the sleeve 9e shrinks not only in the radial direction, to generate the radial press-fit forces which are to be exerted on the tool shank 15e, but also in the axial direction. The axial shrinkage, via the conical surfaces 29e, 33e, on the one hand increases the radial press-fit forces, but on the other hand also stresses the sleeve 9e in the axial direction. It has been found that axial stressing of the sleeve 9a reduces vibrations of the tool holder in operation. Since the conical inner circumferential surface 29e surrounds the outer circumferential surface 33e of the bush 31.e in a frictionally locking manner, friction losses which result there increase the damping action.

The sleeve 9e may consist of the same material as the remainder of the tool holder 1e and also the bush 31e. However, it is preferable for the sleeve 9e to consist of a material whereof the coefficient of thermal expansion is greater than the coefficient of thermal expansion of the bush 31e and at least of that region of the tool holder 1e which forms the stop face 39e. In this way, the clamping displacement of the tool holder 1e and also the maximum axial clamping force which can be achieved by the sleeve 9e can be increased, and as a result the damping action can be improved.

In the exemplary embodiment shown in FIG. 7, the bush 31e is provided with the supporting element structure which has been explained above with reference to FIGS. 1 to 3 or is to be explained below with reference to FIGS. 11 to 15. It will be understood that the supporting surface 17e of the bush 31e may if appropriate also be designed without a supporting element structure of this type.

FIG. 8 shows a tool holder 1f of the shrink-fit chuck type, which differs from the tool holder shown in FIG. 7 and the variants explained there substantially only by virtue of the fact that the bush 31f, which by way of its conical outer circumferential surface 33f bears against the conical inner circumferential surface 29f of the sleeve 9f, is fixedly connected to the tool holder 1f, in this case is welded to it at a weld seam 51, and in order to achieve its radially elastic properties is also provided with axially elongate slots 53 which penetrate through the bush 31f in the radial direction. It will be understood that the bush 31f may also be formed integrally on the tool holder 1f. The sleeve 9f once again has an extension 41f, which surrounds the tool holder 1f at a radial distance on that side of the supporting surface 17f which is axially remote from the rotary tool, and is fixedly connected to the tool holder 1f, in this case welded to it at a weld seam 45, on that side of the extension 41f which is axially remote from the rotary tool. The sleeve 9f preferably consists of a material with a higher coefficient of thermal expansion than the sleeve 31f and the material of the tool holder 1f in the region of the extension 41f.

It is expedient for the tool holder 1f to be heated only in the region of the extension 41f, as indicated by arrows 55 in FIG. 8. The region of the sleeve 9f which surrounds the bush 31f is not heated as well, with the result that the radial press-fit forces acting on the bush 31f are generated exclusively by relative displacement of the conical surfaces 29f, 43f in the axial direction, in the style of a collet chuck. During clamping of the tool holder 1f, axial clamping forces are generated in the sleeve 9f; as explained above in connection with FIG. 7, these axial clamping forces improve the damping properties of the tool holder.

FIG. 10 shows a tool holder 1g of the shrink-fit chuck type, which, similarly to the tool holder 1c shown in FIG. 4, includes a diameter compensation bush 31g in a cylindrical inner circumferential surface 29g of its sleeve 9g. The inner circumferential surface of the diameter compensation bush 31g forms the clamping surface 17g which, in the clamping state of the tool holder 1g, bears with a press fit against the outer circumferential surface 19g of the tool holder 15g which has been fitted into the receiving opening 13g.

Unlike the bush 31 of the tool holder 1c shown in FIG. 4, the bush 31g comprises two sleeves 57, 59 arranged coaxially one inside the other, of which the outer sleeve 57 forms the cylindrical outer circumferential surface 33g and has a conical inner surface. The inner sleeve 59 forms the clamping surface 17g and has a conical outer surface 63 which bears against the conical inner surface of the outer sleeve 57. The inner sleeve 59 is radially elastic in form and, for example in a similar way to the bush 31 shown in FIG. 5, has axially running grooves distributed over in the circumferential direction its inner clamping surface 17g and/or its outer circumferential surface 63. The outer sleeve 57 can also be of radially elastic design in a corresponding way. As an alternative to the grooves, it is also possible to provide radially continuous slots, as illustrated for the bush 31f in FIG. 9. The internal diameter of the clamping surface 17g can be altered and variably adapted to the diameter of the tool shank 15g by relative displacement of the two sleeves 57, 59 in the axial direction. In this way, tool shanks of different diameters within a certain range can be clamped using the same bush 31g.

To clamp the tool shank 15g, the bush 31g which has been removed from the sleeve 9g of the tool holder 1g is fitted onto the tool shank 15g. The clamping surface 17g can then be applied with a tight fit and surface-to-surface contact to the tool shank 15g by axial displacement of the sleeves 57, 59 with respect to one another. To facilitate this operation, an external screw thread 65 is provided at the narrowed end of the inner sleeve 59 and can be screwed into an internal screw thread 67 of the outer sleeve. It is sufficient to compensate only for the play between the clamping surface 17g and the tool shank 15g, since the press-fit forces required for operation are exerted on the tool shank 15g by the sleeve 9g via the bush 31g. To enable the bush to be inserted into the sleeve 9g in an axially defined manner, the outer sleeve 57 bears an annular collar 69 which comes to a stop against the end face 11g of the sleeve 9g.

In the region of its clamping surface 17g, the inner sleeve 59 is provided with a structure of annular supporting elements 25g formed by annular grooves 21g, as has been explained in detail with reference to FIGS. 1 to 5.

In the following text, with reference to FIGS. 11 to 15, a description is given of further variants of the supporting element structure which has already been explained with reference to FIGS. 1 to 3. The supporting element structures can be used not only for the tool holder shown in FIG. 1 but also for the subsequently explained tool holders shown in FIGS. 4 to 10.

In the supporting element structures explained above, the groove sections designed as a helical groove or an annular groove produce supporting elements in the form of elongate webs which are in helical groove or annularly continuous form and surround the axis of rotation. FIG. 11 shows a tool holder 1h whereof the receiving section 5h is formed by a sleeve 9h forming the receiving opening 13h for the tool shank (not shown in more detail). The inner circumferential surface, which once again serves as a clamping surface 17h, of the receiving opening 13h of the sleeve 9h includes a multiplicity of helical groove sections 21h which are arranged next to one another in the axial direction and the groove side faces 23h of which run at right angles in the radial direction.

Two groups of helical groove sections 21h' and 21h" are provided. In a first of the two groups, the helical groove sections 21h" have the same pitch and run next to and at an axial distance from one another, i.e. do not cross one another. The same applies to the helical groove sections 21h" belonging to the second group, but the pitch of the helical groove sections 21h" belonging to the second group, although the same as the pitch of the helical groove sections 21h' belonging to the first group, is in the opposite direction. Accordingly, the helical groove sections 21$h'$ cross the helical groove sections 21$h'$ and in this way form supporting elements 25$h$ which are spaced apart from one another on all sides in the form of diamond-shaped protrusions. Similar protrusions are formed if the two helical groove sections 21$h'$ and 21$h''$ run helically in the same direction but have a different pitch from one another.

FIGS. 12 and 13 show a variant 1$i$ comprising a first group of annular grooves 21$i$ which are normal to the axis and are axially offset with respect to one another, as explained with reference to FIG. 1, and, in addition, a second group of grooves 69, which are offset with respect to one another in the circumferential direction of the clamping surface 17$i$, extend in the direction of the axis of rotation 7$i$ and cross the annular grooves 21$i$. The mutually parallel annular grooves 21$i$ belonging to the first group and the likewise mutually parallel axial grooves 69 belonging to the second group once again in the clamping surface 17$i$ delimit supporting elements 25$i$ which are spaced apart from one another on all sides and are in the form of protrusions, the roof surfaces 27$i$ of which, as in the variant shown in FIG. 11, form the supporting surface 17$i$.

FIG. 14 shows a tool holder 1$k$ which differs from the tool holder 1$a$ shown in FIG. 2 substantially only by virtue of the fact that the annular grooves 21$k$, on their side facing towards the tool insertion side, have a groove side face 23$k$ which runs normally with respect to the axis of rotation 7$k$, and, on their axially opposite side, have a conical groove side face 23$k'$ which narrows in the direction facing axially away from the tool insertion side. Consequently, the supporting elements 25$k$ which remain between adjacent annular grooves 21$k$ are generally trapezium-shaped and are positioned obliquely with respect to the direction in which the tool shank is pulled out.

FIG. 15 shows a variant 1$m$ of the tool holder 1$k$ from FIG. 14, which differs from the latter tool holder substantially only by virtue of the fact that the annular grooves 21$m$ are filled with a filling 71 of a material which differs from the material of the sleeve 9$m$. The filling 71 may consist of ceramic, metal or plastic and, depending on the type of material, improves the vibration damping and/or provides thermal insulation for the tool shank during the shrink-fit operation. It will be understood that the damping or thermally insulating filling can also be employed in the same way for the supporting element structures of the exemplary embodiments explained above in connection with FIGS. 1 to 13. In some cases, it may be sufficient for only some of the total number of groove sections to be provided with a filling of this type or for only a partial section of the longitudinal extent of these groove sections to be filled. This also allows the groove passage to be sealed in particular in the case of axially running grooves or helical grooves.

The invention claimed is:

1. A tool holder of the shrink-fit chuck type, comprising:
a receiving section for holding a shank of a rotary tool coaxially with respect to an axis of rotation of the tool holder, the receiving section including a radially elastic bush section forming a receiving opening for the shank of the rotary tool and a sleeve section surrounding the bush section, the sleeve section and the bush section being arranged coaxially with one another with respect to the axis of rotation, the receiving opening defined by an inner circumferential surface of the bush section which forms a clamping surface for transmitting radial press-fit forces exerted by the sleeve section on the bush section and via the bush section on the shank of the rotary tool, wherein the bush section has a conical outer surface and the sleeve section has a conical inner surface adapted to bear against the conical outer surface when clamping the shank of the rotary tool, the conical outer surface and the conical inner surface narrowing toward an end face of the sleeve section in the direction of the axis of rotation, wherein the bush section is axially supported against the tool holder at a side of the bush section axially remote of the end face of the sleeve section in a predefined axial position with respect to the tool holder and the sleeve section is fixedly connected to the tool holder at a side of the sleeve section axially remote of the end face such that the conical inner surface of the sleeve section is axially displaceable by heating with respect to the conical outer surface of the bush section into a release position releasing the bush section for insertion or removal of the shank or by cooling into a clamping position for exerting radial press-fit forces on the shank via the bush section.

2. The tool holder according to claim 1, wherein the receiving section further comprises at least one of:
a sleeve extension extending axially beyond the region of the clamping surface of the bush section on the side remote of the end face of the sleeve section and surrounding at least one of the tool holder and the bush section at a radial distance with the sleeve section fixedly connected to the tool holder at an end region thereof remote of the end face thereof, and
a material of the sleeve section having a coefficient of thermal expansion greater than the coefficient of thermal expansion of at least one of the bush section and the tool holder at a region thereof surrounded by the sleeve section.

3. The tool holder according to claim 2, wherein the bush section has at least one axially extending compensation joint.

4. The tool holder according to claim 3, wherein the at least one compensation joint is designed as an axially extending groove or as an axially extending slot which penetrates through the bush section in the radial direction.

5. The tool holder according to claim 4, wherein the bush section has a plurality of axially extending grooves or axially extending slots penetrating through the bush section in the radial direction.

6. The tool holder according to claim 5, wherein the bush section has, on its inner circumferential surface distributed in the circumferential direction, a plurality of axially extending grooves and on its outer circumferential surface, additional axially extending grooves, which, with respect to the circumferential direction, are arranged in each case between a pair of grooves on the inner circumferential surface.

7. The tool holder according to claim 1, wherein the sleeve section is welded to the tool holder.

8. The tool holder according to claim 1, wherein the bush section is designed as a bush with its end that is axially remote from the rotary tool formed integrally with the tool holder.

9. The tool holder according to claim 1, wherein the bush section has a plurality of axially extending compensation joints.

10. The tool holder according to claim 1, wherein the bush section is designed as a bush arranged in a stationary position.

11. The tool holder according to claim 10, wherein the bush is welded in place.

12. A method according to claim 11, wherein substantially only the region of the extension of the sleeve section is heated.

13. A method for clamping a rotary tool in a tool holder according to claim 1, comprising:

heating the region of the extension of the sleeve section to transfer the tool holder into the release position.

\* \* \* \* \*